3,076,709
MILK FOOD COMPOSITIONS AND METHOD FOR PREPARING AND USING SAME
Eugene J. Rivoche, 1629 Columbia Road NW., Washington 9, D.C.
No Drawing. Filed Sept. 6, 1961, Ser. No. 136,201
18 Claims. (Cl. 99—54)

This invention relates to novel milk food compositions containing water-soluble, non-ionic alkyl ethers of cellulose, and, in particular, to nutritive food bases and binders containing milk in combination with these cellulose ethers and which can be utilized by mixing with water for the production of food products that are in ready-to-serve form or which may be cooked, optionally after storage in frozen form.

This application is a continuation-in-part of my application Serial No. 68,149, filed November 9, 1960, now abandoned.

The novel food compositions include milk-base premixes for marketing in dry form, as well as solutions or dispersions produced from such premixes. In one aspect, the invention provides a convenient and rapid method for instantaneously placing the cellulose alkyl ethers in solution while at the same time providing food binding, thickening and stabilizing agents having nutritional value.

The novel milk-base binding, thickening, and stabilizing agents may be used in many types of food products. For example, they may be used in the preparation of food products wherein the milk solutions of alkyl ethers of cellulose form heat-reversible gels that function as a cooking and binding medium for food particles. They may also be used in the preparation of extruded food products of the chip, noodle, and macaroni type, and in the preparation of egg patties, omelets and the like. They are quite suitable for the preparation of such foods as dressings, puddings, custards, spreads, toppings, etc. Other uses in the preparation of food products will be apparent from the disclosure herein.

Accordingly, it is an object of the present invention to provide novel milk-base food products of the type described.

Another object of the invention is to provide an improved method for placing non-ionic cellulose alkyl ethers in solution.

Another object of the invention is to provide novel milk-base food binding agents having nutritional value, which can be marketed in dry form and which may be readily reconstituted by addition to cold water.

Another object of the invention is to provide readily water-soluble or dispersible dry dairy products which incorporate food binding, stabilizing and thickening agents, and which may be utilized in the preparation of food patties, omelets, custards, creams, spreads, sauces and other food products.

Another object of the invention is to provide additional valuable properties, i.e., plus properties, to such readily accepted food items as milk powders, egg powders, cheese powders, whey powders, etc.

A further object of the invention is to provide additional properties to powders of non-ionic alkyl ethers of cellulose, whereby such powders readily go into solution in cold water without the need for high speed stirring or strong agitation.

Another object of the invention is to provide compositions and methods for the ready preparation of food binders and bases without the necessity of utilizing starches or elevated temperatures.

Another object of the invention is to provide a milk-food base having a substantially neutral taste, which can be utilized in the preparation of a wide variety of other food products in a very simple manner.

The advantages of utilizing solutions of alkyl ethers of cellulose which have heat-reversible gel-forming properties in the preparation of shaped or portion-sized food products from food particles have already been mentioned. These solutions provide a cooking and binding medium for the food particles. They form heat-reversible gels at cooking temperatures which tend to retain food juices during cooking and prevent excessive migration and rendering of fats, thereby contributing to high quality products. Their binding qualities permit the preparation of entirely novel types of food products. Freezing and subsequent thawing do not destroy the gel-forming properties of solutions of these cellulose ethers, so that the products are quite adaptable to storage in frozen form. In fact, it has been found that freezing and subsequent thawing improves the strength of the gels formed from the methyl cellulose solutions.

The cellulose ethers contemplated by the invention are defined as water-soluble, non-ionic alkyl ethers of cellulose having the property of forming heat-reversible gels in solution. These cellulose ethers include ethyl cellulose, methyl cellulose, methylethyl cellulose, hydroxy propyl methyl cellulose, and hydroxyethyl cellulose. Ionic cellulose ethers such as carboxymethyl cellulose, carboxymethyl hydroxyethyl cellulose and their salts, which do not have the property of forming gels in aqueous solution upon heating and which have entirely different properties with respect to solution-formation and the like, are excluded by this definition. Unlike solutions of other gel-forming materials such as gelatin, alginates, pectinates and the like, which provide harder gels as their temperature is lowered, solutions of the alkyl cellulose ethers contemplated by the invention remain fluid until frozen and do not begin gel formation until heated.

The cellulose methyl ethers marketed under the name of "Methocel" are suitable for the purposes of this invention. Chemically, "Methocel" is a long chain cellulose polymer having a methoxyl content of about 27.5 to 32%. The HG, or high gel grade of Methocel, is, chemically, a mixed hydroxy propyl methyl ether of cellulose. HG–65 indicates a high gel grade of methyl cellulose having a gelation temperature of 65° C. in 2% aqueous solution. HG–70, HG–90, etc., also indicates the temperature at which gelation or hardening begins. These nonionic cellulose ethers will be generally referred to hereinafter as methyl cellulose.

Methyl cellulose products are commercially available in various grades, ranging in viscosity from 10 to 15,000 centipoises in 2% water solution at 68° F. Different viscosity grades may be used with different types of food products. It is possible to mix the various commerically available viscosity grades to obtain a specific desired viscosity. One skilled in the art, guided by the information herein, may readily determine the best grade and type of methyl cellulose for a particular type of food product and for a particular processing operation. For example, in creamy sauces and light custards, concentrations of less than 2% may be used and the higher gelling grades may be used.

While the non-ionic alkyl cellulose ethers such as methyl cellulose, as described above, are designated as water-soluble, they are in fact very difficult to place in solution. Thus, dry methyl cellulose powder must first be dispersed in hot water, above about 180° F., to insure a thorough wetting of all of the particles. Cold water or ice is then added and the mixture must be stirred for a long period while cooling until methyl cellulose particles have become completely hydrated and the mass has become smooth and lump-free. Without such procedure it has been found almost impossible to completely hydrate the powders and obtain a non-lumpy product.

The present invention is based in part on the discovery that when methyl cellulose powders are mixed with water-soluble dry dairy products, the resulting mixture goes rapidly and directly into solution, almost instantaneously, when placed in cold water. By cold water is meant water at the temperature available from the tap without heating. The actual temperature may vary widely from room temperature down to freezing. While room temperature is not a critical maximum, methyl cellulose tends to become less soluble as the temperature of the water is raised, becoming almost completely insoluble at about 180° F. Very little stirring is necessary to form a smooth, lump-free mass. Mechanical stirring devices are not necessary, so that every housewife may make use of the product. It has further been discovered that the resulting solution has much more body than a methyl cellulose solution of the same concentration in water and is capable of forming more stable dispersions of other food particles. The nutritional qualities make the solution a valuable additive to any food with which it is mixed.

The water-soluble, dry dairy products contemplated by the invention include, for example, dry milk powder, either from whole or skim milk, and dry whey powder. Water-soluble caseinates, casein-sodium, casein-ammonium, and the like, may be added to form a part of the dry mixture. Preferably the food-base material is formulated prior to inclusion of other food materials to provide a pre-mix product substantially free of food insolubles. The base mixture may, of course, be formulated with minor amounts of seasonings, flavoring agents and the like. The dispersing and solubilizing properties of the dry milk solid-methyl cellulose mixture is so great that other powdered food products may then be added to the dry base mixture, and are readily dispersed when the necessary quantity of water is added. Thus, materials such as egg powders, cheese powders, etc., which are insoluble in water and could not be readily dispersed with dry milk or methyl cellulose alone, are readily dispersed when the mixture is placed in water. Even dry vegetable granules or cubes such as dry green peppers, onions, celery, fruits, etc., may be added to the dry mixture and reconstituted with advantage at the same time, using the necessary additional amount of water. In one operation, a creamy mass containing reconstituted dry vegetables may be prepared. The thick solution formed by the milk-Methocel aids in the dispersion and suspension of the individual particles of other materials.

The methyl cellulose powders may be mixed with the dried milk products in any desired proportion up to about 50% by weight of methyl cellulose based on the weight of the dried milk solids. Mixtures at the higher methyl cellulose concentrations have been found to go into solution quite readily in water at room temperature or below. The quantity of water employed is usually that necessary to provide a milk-methyl cellulose solution of about ½ to 8% concentration of methyl cellulose. Sufficient methyl cellulose powder with respect to the milk solids may be used to provide a solution of centration of about ½ to 8% when the dried milk solids are reconstituted with that amount of water normally required to provide a milk or cream product. Thus, for example, with skim milk solids, about 10 grams of dried skim milk would normally be added to about 90 grams of water to provide a reconstituted liquid skim milk. In preparing a skimmed milk product incorporating methyl cellulose so as to provide in the resulting reconstituted milk product a concentration of 2% methyl cellulose, 2 grams of methyl cellulose would be mixed with 10 grams of the dried skim milk solids and the mixture added to 88 grams of water. It will be understood, however, that different mixtures may be prepared for different purposes. For preparation of creams and white sauces, one-half the quantity of water to skim is ordinarily used. For a methyl cellulose-milk product for this purpose, one-half the amount of methyl cellulose to dry milk solids would be used in the mixture to provide the same concentration of methyl cellulose in the reconstituted cream. Addition of 1 part of methyl cellulose powder to 10 parts of skim milk solids and addition of the mixture to 39 grams of water, provides a product in the nature of a thick white cream containing 2% methyl cellulose. This product is relatively stable and may be utilized for cream filling of pies, cakes and the like, as well as for use as a neutral binder in other types of food products. In the preparation of products of the cream type, sugar, chocolate, and dry flavoring agents may be added as desired. For cream type products, grades of methyl cellulose such as Methocel HG-90, which form soft gels and semi-gels upon heating, are most desirable. For products to be used in combination with meats and vegetables for retaining a desired shape, harder gel grades should be used. Salt, pepper and other dry flavorings may be added to the mass. A wide range of products of varying consistency can be produced by incorporating from about ½ to 5 parts by weight of methyl cellulose with 10 parts by weight of dry milk solids and dispersing the mixture in about 40 to 120 parts by weight of water.

Other dry food products may be incorporated within limits in the dried milk solids-methyl cellulose mixture without destroying the solubilizing effect of the milk solids on the methyl cellulose. Thus, dry particles of cheese, eggs, flour, vegetables, fruits, meats, fishes, sugar, cocoa, flavorings and the like, can be utilized to provide a great variety of products. Preferably, the added insolubles do not comprise over about 90% of the dry mix. Some materials permit the addition of larger quantities than others. The less hygroscopic the additive, the higher the quantity that can be used. Thus, relatively larger quantities of granulated cheese can be used. After the dry mix has been reconstituted with water, additional food materials may be added to any extent desired.

The discovery of the solubilizing properties of dry milk solids on methyl cellulose permits the use of continuous operations for placing methyl cellulose in solution on a commercial basis. Thus, a homogeneous mixture of dry milk and methyl cellulose may be metered into a flowing stream of water and is dispersed therein by passing through a centrifugal pump (e.g., a Norman type pump such as is used for continuous mixing of flour with liquids in the dough industries). After passing through this pump, the mixture need only be retained for a very short period of time for the methyl cellulose to go completely into solution. For this purpose, the mixture may be passed from the mixing pump through a mixing pipe to a storage tank provided with a slow agitator, from which portions are withdrawn at the approximate same rate as the feeding rate.

The invention will be further understood from the following examples of practice:

EXAMPLE 1

*Food Base Formula 1*

| | Parts by weight |
|---|---|
| Dried skim milk solids | 10 |
| Methyl cellulose (HG-65) | ½–5 |

A series of excellent products which readily go into solution contain from ½ to 5 parts by weight of methyl cellulose to 10 parts by weight of the dried skim milk solids. Higher concentrations of methyl cellulose to dry milk solids can be used where mechanized stirring is to be employed.

The foregoing ingredients are thoroughly mixed to form a homogeneous powder. The product is then packaged in bulk for industrial use or in convenient quantities for use by the housewife. It may be used in the preparation of food patties or other food products from food particles, as previously described. For example, 10 parts of the dried product may be added to 90 parts of cold water as it is drawn from the tap and immediately goes into solution, forming a rather thick fluid base in which other food particles may be dispersed as desired. The consistency may be varied by varying the quantity of the water. Preferably, the quantity of solution mixed with other food partices is such as to provide no more than about ½ to 2% of methyl cellulose in the final food product. The novel binder, however, has the same nutritional value as reconstituted milk. The reconstituted fluid mass may be placed in cartons or cans, frozen and marketed as a frozen product. Pasteurization does not change its properties so that it may be marketed unfrozen as a canned product.

EXAMPLE 2

Patty Product From Formula 1

Ten parts by weight of the dry premix of methyl cellulose and skim milk (Formula 1), as set forth in Example 1 (4 parts methyl cellulose to 10 parts dry skim milk), are reconstituted with 90 parts by weight of water. The resulting thick, viscous solution is mixed with 100 parts by weight of chopped fresh vegetables and 200 parts by weight of ground meat. The resulting mixture is then packaged in bulk containers or made into patties. Storage in either instance can be by freezing, or the product may be shaped and cooked directly from the freshly prepared mixture, to provide a tasty meat-vegetable portion.

EXAMPLE 3

Food Base Formula 2

| | Parts by weight |
|---|---|
| Dried skim milk solids | 10 |
| Methocel (U.S.P., 4000 cps.) | 2 |
| Methocel (HG–65, 4000 cps.) | 2 |

The foregoing materials are intimately mixed to provide a homogeneous product which can be packaged for marketing to the consumer for preparation of nutritious binding agents, as described above.

EXAMPLE 4

Fruit Patty Product

| | Oz. |
|---|---|
| Peeled and chopped fresh apples | 24 |
| Frozen strawberries | 20 |
| Chopped bananas | 10 |
| Pineapple tidbits | 1 |
| Frozen peaches | 10 |
| Applesauce | 48 |

These ingredients are mixed and flavored with ½ tsp. cinnamon, ½ tsp. lemon flavor and 5 oz. sugar. The entire mixture is then intimately admixed with 25% by weight of a binding solution prepared by reconstituting the dry food base, Formula 2, described in Example 3 above, with 90% by weight of water. The resulting mixture is placed in molds, frozen and cut into portions for marketing as a frozen fruit product adapted to be cooked by placing the frozen portions on a hot surface.

EXAMPLE 5

Cheese Soufflé Dry Mix

| | Parts by weight |
|---|---|
| Dried skim milk solids | 10 |
| Methocel (HG–90, 15,000 cps.) | 1.5 |
| Methocel (HG–65, 4,000 cps.) | 1.5 |
| Cheese powders | 3 |

The foregoing materials are intimately mixed to provide a homogeneous product. This product may be mixed with 90% by weight of water to provide a thick, creamy mass which may be cooked to provide a cheese soufflé type of omelet. If desired, other food products such as ham tidbits and the like may be incorporated into the fluid mass after the dried product has been reconstituted and prior to cooking.

EXAMPLE 6

Low-Calorie Cream Filling

| | Parts by weight |
|---|---|
| Dried skim milk solids | 20 |
| Methocel (HG–90) | 3.5 |
| Water | 80 |

The foregoing dry ingredients are intimately admixed to provide a homogeneous product which can be marketed to provide a low calorie cream filling upon reconstitution with about 80 parts by weight of water. It will be noted that the quantity of skim milk solids is double that utilized to prepare a reconstituted milk product. This product may be sweetened, spiced, or flavored as desired.

EXAMPLE 7

Food Base Formula 3

| | Parts by weight |
|---|---|
| Dried skim milk solids | 10 |
| Methocel (HG–65, 6,000 cps.) | 4 |
| Water | 86 |

The foregoing dry ingredients are homogeneously mixed and then stirred into the water. A thick, viscous solution is immediately formed. This solution is forced into wide-mouth, cardboard containers which are then transferred to a freezing unit. The frozen product is marketed through frozen food distributors for purchase and use by the housewife. Upon thawing, a strong food binder of high nutritional value is provided. Instead of placing in cartons for freezing, the fluid product may be pasteurized and canned for marketing. The dry ingredients can also be mixed and marketed in dry form with instructions to add to a specified amount of water.

EXAMPLE 8

Food Base Formula 4

A dry food base is prepared by intimately admixing the following dry ingredients.

| | Parts by weight |
|---|---|
| Methocel (½ U.S.P., 8,000 cps., ½ HG–65, 4,000 cps.) | 1 |
| Dried skimmed milk | 10–15 |

The foregoing dry mixture provides an excellent base for light cremes and spreads, as well as for preparation of patty and other types of food products.

EXAMPLE 9

Chocolate Creme Dry Mix

A dry mix for preparation of chocolate cremes is prepared by mixing the following dry ingredients.

| | Parts by weight |
|---|---|
| Food base Formula 4 (1 to 15) | 8 |
| Cocoa | 5 |
| Sugar | 10½ |
| Pregelatinized starch | ¾ |

An excellent chocolate creme or pudding can be prepared by stirring the foregoing dry mixture in cold water in proportions of about 1¾ ounces of the dry mix to 2 ounces of water. The amount of water can be varied to provide different consistencies, as desired.

EXAMPLE 10

Crepe Suzettes Dry Mix

A dry mix is prepared from the following ingredients.

| | Parts by weight |
|---|---|
| Food base Formula 4 (1 to 15) | 1 |
| Wheat flour | 1½ |
| Sugar | 1 |
| Salt | ⅛ |
| Dry whole eggs | 3½ |

The foregoing mixture when stirred with water in proportions of about 1 ounce of the dry mixture to 4 ounces of water provides a fluid mass that spreads upon a hot cooking surface to give an excellent thin, tender crepe suzette crust that can readily be filled and rolled without breaking.

EXAMPLE 11

*Bleu Cheese Spread or Dressing Dry Mix*

A dry mix is prepared by mixing the following:

| | Parts by weight |
|---|---|
| Food base Formula 4 (1 to 10) | 2 |
| Bleu cheese (crumbled) | 2 |
| Wheat flour | 1 |
| Dry parsley | 1/20 |

Bleu cheese salad dressing is prepared by stirring the above dry mix into water in proportion of about 1 ounce of dry mix to 2 ounces of water. Lesser amounts of water can be used for cheese spreads.

EXAMPLE 12

*Cheese Spread Dry Mix*

Dry mixes are prepared from the following:

| | Parts by weight |
|---|---|
| Food base Formula 4 (1 to 10) | 2 |
| Shredded processed cheese | 2–3 |
| Spice flavoring (optional) | 0.3 |

The foregoing dry mix is stirred in water in proportions of about 1 to 1½ ounces to 2 ounces of water.

EXAMPLE 13

*Hollandaise Dry Mix*

A dry mix is prepared from the following ingredients.

| | | |
|---|---|---|
| Food base Formula 4 (1 to 15) | ounces | 12½ |
| Dry whole eggs | do | 5 |
| Salt | teaspoons | 2 |
| Citric acid | do | ½ |
| Flavoring—lemon, red pepper, etc., to taste. | | |

The foregoing dry mixture is mixed with about 1 ounce of vegetable oil and 4 ounces of water to provide a Hollandaise sauce.

EXAMPLE 14

*Potato Pancake Dry Mix*

The following dry ingredients are mixed:

| | | |
|---|---|---|
| Potato flakes | lb | 1 |
| Food base Formula 4 (1 to 15) | oz | 4 |
| Wheat flour | oz | 8 |
| Whole eggs, powdered | oz | 4 |
| Egg yolks, powdered | oz | 4 |
| Spices | oz | 2 |
| Salt | oz | ½ |
| Dry parsley | oz | 1/8 |
| Baking powder | oz | 1 |

The foregoing dry mix is mixed with water in proportions to provide a batter of any desired consistency, depending upon the thickness of the fried cake wanted.

The dry mixes set forth above have good shelf life. They may be packaged as desired for portion control or for bulk use.

It will be understood that in any of the foregoing examples, dry whole milk or dry whey can be substituted for the dry skim milk. Further liquid whole milk, skim milk or whey may be used to make methyl cellulose solutions, but in this case the same technique as used to place methyl cellulose in solution in water must be employed.

An additional important advantage in the use of the dry milk solids in placing methyl cellulose in solution is the reduction of the foaming tendency during stirring. No anti-foaming agents are necessary.

I claim:

1. A nutritive dry food-base composition which is readily dispersible in water consisting of a homogenous mixture of a water-soluble dry milk product and from about ½ to 50% by weight based on the weight of the milk solids of a water-soluble dry non-ionic alkyl ether of cellulose.

2. The composition of claim 1 wherein the alkyl ether of cellulose is methyl cellulose and the dry milk product is selected from the group consisting of dry skim milk, dry whole milk and dry whey.

3. A fluid food-base preparation consisting of a mixture of from about ½ to 5 parts by weight of methyl cellulose with about 10 parts by weight of dried milk solids, dispersed in about 40 to 120 parts by weight of water.

4. A dry mixture readily dispersible in water to form a cheese product, comprising a homogeneous mixture of water-soluble dried milk solids with from about ½ to 50% of methyl cellulose based on the weight of the dried milk solids, in admixture with dried cheese particles.

5. The product as defined in claim 4 wherein the ingredients comprise the following:

| | Parts by weight |
|---|---|
| Pre-mix of methyl cellulose and dry milk solids in approximately 1 to 10 proportions | 2 |
| Cheese particles | 2–3 |

6. A dry mixture readily dispersible in water to form a chocolate food product, comprising a homogeneous mixture of a pre-mix consisting of water-soluble dried milk solids with from about ½ to 50% methyl cellulose based on the weight of the dried milk solids, to which cocoa and sugar have been added.

7. The product as defined in claim 6 wherein the premix contains about 1 part methyl cellulose to 15 parts by weight of dry milk solids.

8. A dry mixture readily dispersible in water to form a crepe suzette batter, comprising a homogeneous mixture of a pre-mix consisting of water-soluble dried milk solids with from about ½ to 50% of methyl cellulose based on the weight of the dried milk solids, to which dry egg powder, cereal flour, sugar and seasoning have been added.

9. The product as defined in claim 8 wherein the premix contains about 1 part methyl cellulose to 15 parts by weight of dry milk solids.

10. A dry mixture readily dispersible in water and oil to form a sauce of the Hollandaise type, comprising a homogeneous mixture of a pre-mix consisting of water-soluble dried milk solids with from about ½ to 50% of methyl cellulose based on the weight of the dried milk solids, to which dry egg powder, edible food acid, seasoning and flavoring have been added.

11. The product as defined in claim 10 wherein the pre-mix contains about 1 part methyl cellulose to 15 parts by weight of dry milk solids.

12. A dry mixture readily dispersible in water to form a potato pancake mix, comprising a homogeneous mixture of a pre-mix consisting of water-soluble dried milk solids with from about ½ to 50% of methyl cellulose based on the weight of the dried milk solids, to which dry potato particles, cereal flour, egg powder, seasoning and baking powder have been added.

13. The product as defined in claim 8 wherein the pre-mix contains about 1 part methyl cellulose to 15 parts by weight of dry milk solids.

14. The composition of claim 1 including a minor portion of a food additive selected from the group consisting of sweetening, seasoning and flavoring agents and combinations thereof.

15. A food composition comprising the food base composition of claim 1 in admixture with dehydrated potato particles.

16. A food composition comprising the food base composition of claim 1 in admixture with fruit particles.

17. A food composition comprising the food base composition of claim 1 in admixture with fresh vegetable particles.

18. A food composition comprising the food base composition of claim 1 in admixture with meat particles.

References Cited in the file of this patent

UNITED STATES PATENTS

| | | |
|---|---|---|
| 2,798,814 | Rivoche | July 9, 1957 |
| 2,802,741 | Weaver et al. | Aug. 13, 1957 |
| 2,868,653 | Diamond et al. | Jan. 13, 1959 |